US007645491B2

(12) United States Patent
Bush et al.

(10) Patent No.: US 7,645,491 B2
(45) Date of Patent: Jan. 12, 2010

(54) VENTING ASSEMBLY FOR DIP COATING APPARATUS AND RELATED PROCESSES

(75) Inventors: Steven D. Bush, Red Creek, NY (US); Michael J. Duggan, Webster, NY (US); Mark E. Klino, Palmyra, NY (US); Peter Schmitt, Williamson, NY (US)

(73) Assignee: Xerox Corporation, Norwalk, CT (US)

( * ) Notice: Subject to any disclaimer, the term of this patent is extended or adjusted under 35 U.S.C. 154(b) by 743 days.

(21) Appl. No.: 11/157,715

(22) Filed: Jun. 21, 2005

(65) Prior Publication Data

US 2005/0266188 A1 Dec. 1, 2005

Related U.S. Application Data

(62) Division of application No. 10/857,705, filed on May 28, 2004, now Pat. No. 6,962,626.

(51) Int. Cl.
*B32B 1/08* (2006.01)

(52) U.S. Cl. .................................................... 427/430.1

(58) Field of Classification Search .............. 427/430.1, 427/350; 118/400, 429

See application file for complete search history.

(56) References Cited

U.S. PATENT DOCUMENTS 3,565,039 A 2/1971 Remer
4,265,990 A 5/1981 Stolka et al.
4,390,611 A 6/1983 Ishikawa et al.
4,551,404 A 11/1985 Hiro et al.
4,588,667 A 5/1986 Jones et al.
4,596,754 A 6/1986 Tsutsui et al.
4,620,996 A * 11/1986 Yashiki .................... 427/430.1
5,334,246 A 8/1994 Pietrykowski, Jr. et al.
5,681,391 A 10/1997 Mistrater et al.
5,693,372 A 12/1997 Mistrater et al.
5,720,815 A 2/1998 Swain
5,725,667 A 3/1998 Petropoulos et al.
6,010,572 A 1/2000 Furusawa et al.
6,207,337 B1 3/2001 Swain
6,296,704 B1 10/2001 Yamazaki
6,328,800 B1 12/2001 Yamazaki
6,410,093 B2 6/2002 Ohira et al.
6,547,885 B1 4/2003 Swain
6,641,666 B2 11/2003 Dattilo
2003/0037727 A1 * 2/2003 Yasuda et al. ............... 118/400
2003/0077396 A1 4/2003 LeCompte et al.

* cited by examiner

*Primary Examiner*—Timothy H Meeks
*Assistant Examiner*—Nathan T Leong
(74) *Attorney, Agent, or Firm*—Fay Sharpe LLP

(57) ABSTRACT

Disclosed is a venting assembly for a dip coating system, a dip coating system utilizing such venting assembly, and related method for dip coating. These aspects are particularly directed for the production of organic photoconductor layers in imaging devices, and more particularly to drum photoreceptors. The venting assembly eliminates or significantly reduces coating defects otherwise occurring in the production of drum photoreceptors. Also disclosed are the drum photoreceptors produced by this assembly, apparatus and coating process.

12 Claims, 7 Drawing Sheets

VENTING ASSEMBLY FOR DIP COATING APPARATUS AND RELATED PROCESSES

CROSS-REFERENCE TO RELATED APPLICATIONS

This is a divisional of U.S. application Ser. No. 10/857,705, now U.S. Pat. No. 6,962,626, filed May 28, 2004 by the same inventors, and claims priority therefrom. This divisional application is being filed in response to a restriction requirement in that prior application.

The present disclosure relates to venting assemblies for dip coating apparatuses and related processes. It finds particular application in conjunction with the production of photosensitive members such as drum photoreceptors or layers thereof, and will be described with particular reference thereto. However, it is to be appreciated that the present exemplary embodiment is also amenable to other like applications.

Electrostatographic imaging systems, which are well known, involve the formation and development of electrostatic latent images on an imaging surface of an electrostatographic or photoreceptor. Xerographic photoreceptors can be prepared in either a single-layer or a multilayer configuration. Depending on the application, the photoreceptors can be prepared in several forms, such as flexible belts, cylindrical drums, plates, etc. Belts are usually prepared on polymer substrates, poly(ethylene terephthalate) being the most common. For drums, the substrate is typically a metal cylinder. Usually, hollow aluminum cylinders are widely used in low- and mid-volume applications. The drum configuration, however, has certain process limitations for high-volume and color applications.

Photoreceptors are prepared by the sequential application of various layers (i.e., charge generating layer, charge transport layer, etc.) onto the outer surface of a polymer or drum substrate. Many coating techniques (i.e., spraying, spinning, extrusion, dipping, blade coating, roll coating, etc.) may be utilized to produce these layer(s). Vapor deposition may also be used for metallization and application of some pigments.

Most layers are coated from solutions or dispersions in organic solvents which produce solvent vapors. The choice of solvent is determined by such factors as materials solubility, evaporation rates, surface tension, toxicity, and environmental regulations. Commonly used solvent classes are alcohols, aromatics, esters, ethers, ketones, and nitriles. Because rapid solvent evaporation rates are desirable, low boiling solvents are preferred. Nevertheless, high boiling solvents such as toluene can be successfully used for some applications. In special cases, aqueous solutions or dispersions can also be used.

For the production of drum or other cylindrical photoreceptors, dip coating of one or more of the layers can be utilized. In this technique, a drum is pushed or lowered through an annulus into a bath of a coating solution to produce the desired layer(s). A related technology is dip coating where the drum substrate is dipped into a coating vessel such as a dip tube containing a bath of a coating solution and then withdrawn or pulled at a specified rate. The withdrawn or pulled drum substrate carries a thin coating of the material from the bath. The liquid coating is then dried to form a coating layer. Continuous coatings of successive drums are possible in this process.

Coating vessels used in such dip coating processes have various shapes and generally consists of a bottom, an open top and a cylindrically shaped vertical interior wall having a diameter greater than the diameter of the drum to be coated.

Optionally, the coating vessel may contain a mandrel adapted to maintain the outer surface of the drum in a concentric relationship with the vertical interior wall of the cylindrical coating vessel while the drum is dipped or immersed in the coating solution. The liquid coating material in the bath may be stationary or flowing, such as circulating upwardly in the coating vessel from an inlet at the bottom of the coating vessel and allowed to overflow from the bath into an overflow tank. If desired, the coating may be continuously fed into the bottom of the coating vessel and allowed to continuously overflow from the coating vessel. The overflowing coating liquid is collected in the tank and recycled to the coating bath.

Examples of such dip coating processes and apparatuses discussed above are set forth in U.S. Pat. Nos. 4,620,996; 5,334,246; 5,681,391; 5,693,372; 5,720,815; 5,725,667; and, 6,207,337, the disclosures thereof are incorporated herein by reference in their entirety. The appropriate components and processes of these patents may be selected for the apparatuses and processes further disclosed herein.

There are many coating defects produced by dip coating processes and other coating techniques that may degrade or otherwise deleteriously affect the layers of the photoreceptor. Some defects that have been described in the literature are bloom, blush, bubbles, chatter marks, cracking, cratering, crazing, haze, mottle, orange peel, particles, repellencies, scratches, streaks, voids, etc. Drying-related defects can frequently be reduced by the judicious use of surfactants to control the surface tension. However, surfactants cannot cure all defects and in certain instances, can lead to other problems.

Additionally, the uniformity of the coating or film contributes to the electrophotographic characteristics of a photosensitive layer of an electrophotographic photosensitive member. Consequently, it is important to remove the unevenness of the coating layer(s).

In a conventional dip coating system, a vent system is used to remove solvent vapors from the dipping tank, and specifically, above the coating liquid through one or more vents along the side of the tank. This approach however, is only satisfactory since there often remains some degree of non-uniformity in the finished photoreceptors. The level of non-uniformity is within specification for many layer(s) of the products, but will not satisfy the stricter uniformity requirements for certain high grade photoreceptors.

Accordingly, a need exists for a venting assembly and method which avoids the problems associated with coating defects, and particularly non-uniformity of the resulting coating(s). Furthermore, there is a continuing need for an improved system for coating electrophotographic imaging members.

In accordance with one aspect of this disclosure, a venting assembly is provided which is adapted for use with a dip coating apparatus for producing a photosensitive member such as a drum photoreceptor. The apparatus includes a tank for holding a dip coating liquid, one or more dip tubes vertically arranged within the tank wherein each dip tube is adapted to receive (i) a flow of the dip coating liquid, and (ii) a base substrate of a photosensitive member, such as a cylindrical drum, to be coated with the liquid. The coating liquid is comprised of film forming materials to be included in the photosensitive member and a solvent which produces a vapor.

The venting assembly comprises a plurality of vent tubes arranged within the tank, around each dip tube, such as to optionally uniformly surround each dip tube. Each vent tube has a vapor withdrawing end positioned above a surface of the dip coating liquid and an outlet end. The venting assembly also comprises a venting manifold in flow communication with each outlet end of the plurality of vent tubes.

Upon inducing a pressure differential between (i) the vapor withdrawing end of each vent tube and (ii) the venting manifold to thereby cause vapor flow into the venting manifold, vapors residing above the surface of the dip coating liquid are removed therefrom by the venting tubes in a uniform fashion thereby promoting uniform drying of drums coated with the dip coating liquid. Also included herein, is a dip coated drum photoreceptor which is produced utilizing such a dip coating and venting assembly.

In another aspect according to this disclosure, a dip coating apparatus is provided. The apparatus comprises a tank adapted to contain a dip coating liquid. The tank has a side wall and a bottom wall. The dip coating apparatus further comprises at least one vertical dip tube extending through the bottom wall of the tank to a level above the dip coating liquid. The dip tube defines an open upper end for receiving a component to be contacted with the dip coating liquid and a lower end opposite the upper end. The lower end is adapted to receive the flow of the dip coated liquid. Upon receipt, the dip coated liquid circulates upwardly in the dip tube from the inlet at the bottom and, in some instances, over the open upper end of the dip tube into the tank where it is optionally recirculated.

The dip coating apparatus also comprises a plurality of vertically disposed vent tubes arranged within and/or across the tank around each dip tube. In some instances, the vent tubes uniformly surround each dip tube. Also included is a venting manifold having inlets and an outlet. The venting manifold is adapted to transfer vapors introduced at the inlets to the outlet of the manifold. Each vent tube includes an end in communication with the corresponding inlet of the venting manifold.

Upon providing the dip coating liquid to the dip tube and the tank, the solvent vapors will collect in a region or zone above a surface of the dip coating liquid. The vapors are then transferred through the plurality of the vertically disposed vent tubes to the outlet of the venting manifold. As a result, the vapors are withdrawn from the zone above the surface of the dip coating liquid in a substantially uniform manner. The apparatus can be configured to coat a single drum or multiple drums in a single layer or in multiple layer processes.

In application, a component to be dipped, such as a cylindrical drum for a photoreceptor, is dipped or immersed into the dip tube containing a bath of the dip coating liquid and withdrawn at a specified rate. The withdrawn drum carries a coating from the bath which is then at least partially dried and/or cured in the vented zone above the dip coating liquid.

A dip coated drum photoreceptor exhibiting greater coating uniformity produced by the above noted apparatus and venting system is also included in another aspect of the disclosure. The resulting dip coated drum photoreceptor can be either a single layer or a multi-layer device.

In yet a further aspect according to the disclosure, a process for reducing the frequency of defects of dip coated cylindrical or drum photoreceptors is provided. The process is performed using a dip coating apparatus including (i) a tank for holding a dip coating liquid, (ii) a plurality of dip tubes arranged across the tank, and (iii) a plurality of vent tubes arranged across the tank and around each dip tube. The process comprises providing a dip coating liquid to the tank and/or dip tubes. The process further comprises dip coating a plurality of drums by inserting a drum within a corresponding dip tube and thereby contacting the drum with the dip coating liquid. The drums are then removed from the liquid to form a smooth, homogenous coating or layer of the desired thickness on the drum surface. The process also comprises removing, in a relatively uniform fashion, vapors residing above a surface of the dip coating liquid in the tank through the plurality of vent tubes. Such uniform removal of vapors promotes even drying and/or curing of the coated drums and reduction in the frequency of defects.

Also included herein is a dip coated drum photoreceptor produced by the above described process having coating layers of improved homogenously, thicknesses and/or widths. The dip coated photoreceptor drums can be utilized to provide value-added and enhanced performance capabilities to known printing and copying devices.

In a further aspect, the disclosure provides an electrophotographic sensitive member coating method for forming a photosensitive layer of uniform thickness on the external circumferential surface of a cylindrical base member. The method incorporates a venting system which produces a nearly uniform solvent vapor concentration near the cylindrical base members during the dip coating and withdrawing process. By controlling the concentration of the solvent vapor in a zone near the cylindrical base member while the base members are withdrawn during dip coating, unevenness in film thickness is reduced. This process can be utilized to produce cylindrical base members having very thin and uniform layer(s), such as drum photoconductors having a charge generating layer having a thickness of from about 0.05 μm to about 100 μm, including from about 0.10 μm to about 5.0 μm and/or charge transport layers having a thickness of from about 5 μm to about 500 μm, including from about 10 μm to about 50 μm. Optional under coats, over coats and other layers can also be produced.

These and other aspects and/or objects of the disclosure are more particularly discussed below.

The following is a brief description of the drawings, which are presented for the purposes of illustrating the disclosure set forth herein and not for the purposes of limiting the same.

Figure 1:
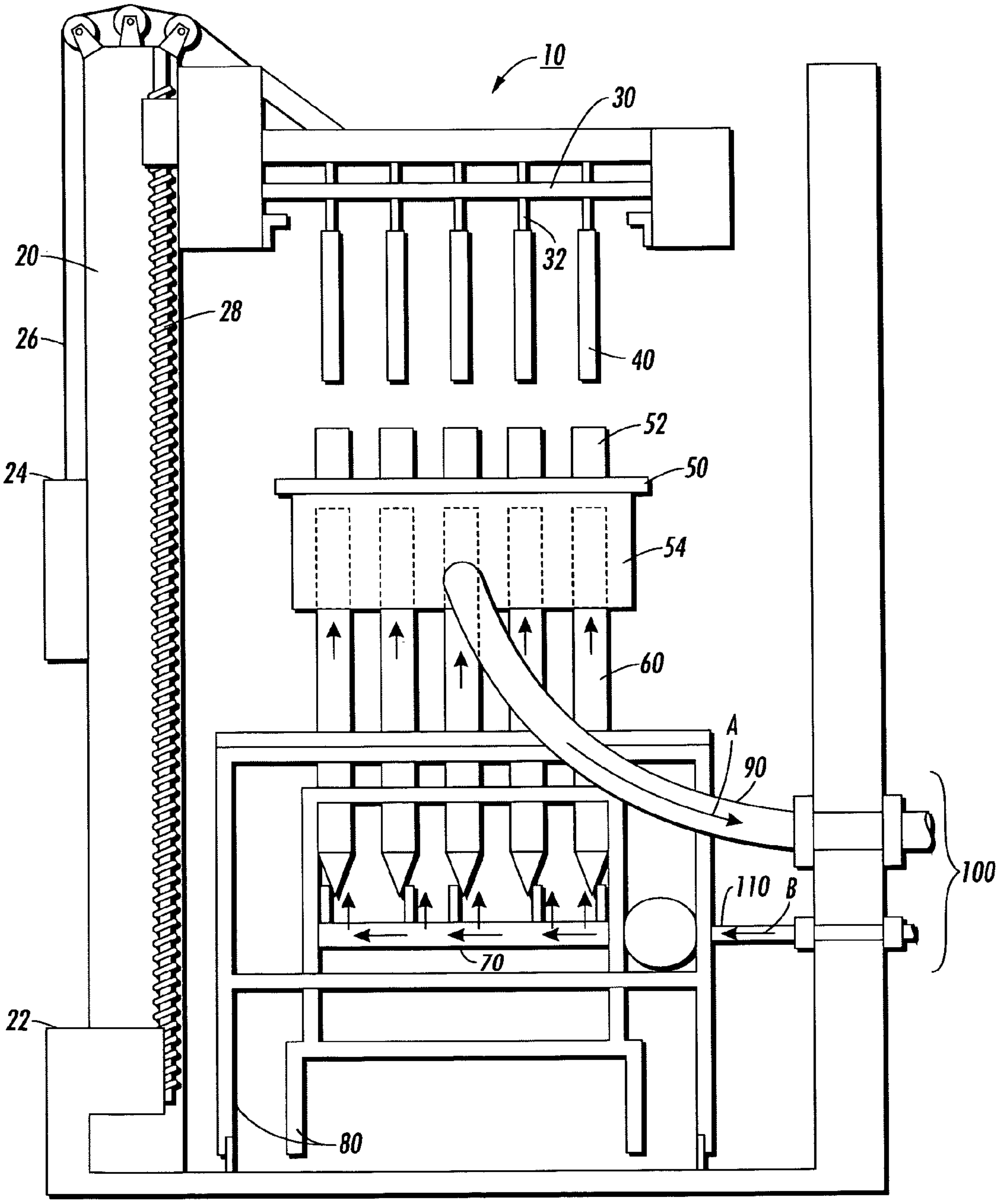
FIG. 1 is a schematic illustration of a dip coating apparatus.

In a conventional dip coating process, solvent is evaporated off and away from the substrate during the coating process. One of the most crucial specifications of the finished photoreceptor is the non-uniformity measurement. This type of measurement is with regard to the uniformity of the photoreceptor system (i.e., optional undercoat layer, charge generating layer, charge transport layer, optional overcoat, etc.) deposited on the substrate such as a cylindrical base member or drum substrate. Often, this measurement is directed to coating or layer thickness and its uniformity across a region of the drum, or between different drums. In accordance with the present disclosure, non-uniformity is controlled during the coating process by removing the evaporated solvent from the coated drum in a specific area or zone, such as the meniscus area.

In conventional systems, when producing the coated layer, the venting of solvents is achieved through two vent holes in the return lines for each dip tank. This process works fairly well but has at least one drawback. It has been discovered that, since all of the solvent vapor is drawn to one side of the dip tank, some of the drums are exposed to much more solvent vapor than others. This unequal exposure results in different rates and degrees of drying of the layer(s) of the coated drums. And this is believed to result in non-uniformity of coated drum photoreceptors. Accordingly, this is not an acceptable method of solvent venting for certain high grade products.

The present disclosure provides a venting assembly, a dip coating system using such a venting system, and related method for use in dip coating operations, and particularly in the production of photoreceptor layers or coatings applied to cylindrical base members such as drum substrates. The disclosure relates to the single or multi-layer optional photoconductive drums or other substrated members produced by the venting assembly and dip coating system disclosed herein. The solvent vapors are exhausted by the vent tubes to produce a relatively uniform concentration of solvent vapor above the dip coating solution. This results in the formation of substantially uniform coats on the drum substrates subsequent to dip coating and removal.

In accordance with the present disclosure, a dip tank venting assembly is provided which utilizes a plurality, or a collection of preferably three or more, vertical vent tubes around each dip tube. Optionally, the vents uniformly surround each dip tube. This new assembly can be used alone or in conjunction with prior or previously existing vents or venting assemblies in conventional dip coating systems.

Each vent of the collection of vents leads to a venting manifold. In certain embodiments, each vent tube entering or leading to the manifold includes a valve or other flow governing element to allow control of solvent vapor flow therethrough. The ability to control each vent tube individually allows an operator the opportunity to monitor and govern the solvent flow for each tube thereby controlling the uniformity within batch, better than any other previous technique. By providing vents on multiple sides of each dip tube, it is possible to ensure that all drums or tubes undergoing coating will dry and/or cure at the same rate. This controlled drying leads to increased uniformity control.

Furthermore, the increased uniformity and top edge sloping control (described in greater detail herein) promotes higher pullrates, i.e. the rate of withdrawal of a coated drum from the dip coating liquid. Increased pullrates have two major advantages over slower speeds. The first is that higher pullrates decrease cycletime, which increases throughput. The second is that the shorter submersion time renders drums coated via the dip process more resistant to the occurrence of various other coating defects. Some of those defects are burps, dimples, dents, streaks, run, sag, and rings.

A more complete understanding of the processes and apparatuses disclosed herein can be obtained by reference to the accompanying drawings. These figures are merely schematic representations based on convenience and the ease of demonstrating the existing art and the present development, and are, therefore, not intended to indicate relative size and dimensions of the venting assemblies or components thereof.

Although specific terms are used in the following description for the sake of clarity, these terms are intended to refer only to the particular structure of the embodiments selected for illustration in the drawings, and are not intended to define or limit the scope of the disclosure. In the drawings and the following description below, it is to be understood that like numeric designations refer to component of like function.

It is noted that the description, as well as the claims, of the present disclosure, as provided herein, make frequent use of the terms "horizontal" and "vertical." It is intended that these terms be used quite literally throughout the description as well as the claims, such that "horizontal" defines a plane substantially parallel to the horizontal and "vertical" defines a plane substantially perpendicular to the horizon.

FIG. 1 illustrates a dip coating apparatus 10 for producing dip coated drum photoreceptors. Specifically, the dip coating apparatus 10 comprises a lifting and lowering assembly 20 including a gearbox and drive system 22. The lifting and lowering assembly 20 may further include a ball screw 28 for lifting and lowering a carrier 30. The assembly 20 can further comprise one or more counterweights 24 connected or attached to the assembly with cables 26. As will be appreciated, the counterweights 24 assist in the raising of the carrier.

The carrier 30 preferably includes a collection of releasable connectors or chucks 32. Each chuck 32 is adapted to receive or otherwise releasably engage a drum 40 for dip coating to form a drum photoreceptor.

The apparatus 10 further comprises a cover plate 50 disposed on a tank or bath 54 which contains a dip coating liquid. A collection of draft shields 52 are disposed on the cover plate and positioned so as to accommodate a plurality of dip tubes 60 extending upward through the bottom of the tank.

The coating apparatus 10 also comprises a dip coating liquid manifold 70. The coating apparatus 10 also includes a support frame 80. A dip coating liquid manifold 70 operates with a liquid return line 90 to transfer dip coating liquid to and from the tank 50 to a pump room 100. One or more feed lines 110 may be used to facilitate transfer of the dip coating fluid to the tank 54.

Flow of dip coating liquid through the return line 90 from the tank 54 is designated by arrow A. And, flow of dip coating liquid through the feed line 110 and the dip coating liquid manifold 70 to the tank 54 is designated by arrow B.

It will be appreciated that the dip coating liquid or fluid is in most instances a dispersion of one or more dip coating components dispersed in a solvent or liquid carrier. This is generally referred to in this description herein as the dip coating liquid 120. The solvent or liquid carrier can be any solvent or liquid used in dip coating. Representative examples of the solvent or liquid carrier include, but are not limited to tetrahydrofuran (THF), xylene, n-butyl acetate, iso-butyl acetate, monochlorobenzene, n-butyl alcohol, ethyl alcohol, cyclohexane, cyclohexanone, methylene chloride, methyl ethyl ketone toluene, and the like.

It will be understood that in the particular dip coating system shown in FIG. 1, dip coating liquid is administered to the bottom end of each dip tube 60 and caused to flow upward through each dip tube 60. The dip coating liquid exits the top end of each dip tube 60 and flows downward along the outer periphery of the respective dip tube 60. The dip coating liquid is collected within the tank 54 and upon its level reaching a threshold value, drains by gravity or is otherwise transferred into the liquid return line 90.

During coating of the drums 40, the carrier 30 to which the drums 40 are attached, is lowered toward the tank 54. The plurality of drums is arranged on the carrier 30 such that each drum 40 is received by a corresponding dip tube 60. As the carrier is further lowered, the drums are contacted with dip coating liquid in each of the dip tubes 60. In this particular system, the movement of the drums 40 during initial contact with the dip coating liquid is countercurrent. However, the exemplary embodiments may readily be utilized in other dip coating systems including for instance static, non-flowing bath of the dip coating liquid. Moreover, a wide array of dip coating strategies and techniques may implement the exemplary embodiments described herein. That is, in no way is the present discovery limited to use with the dip coating system depicted in FIG. 1.

Figure 2:
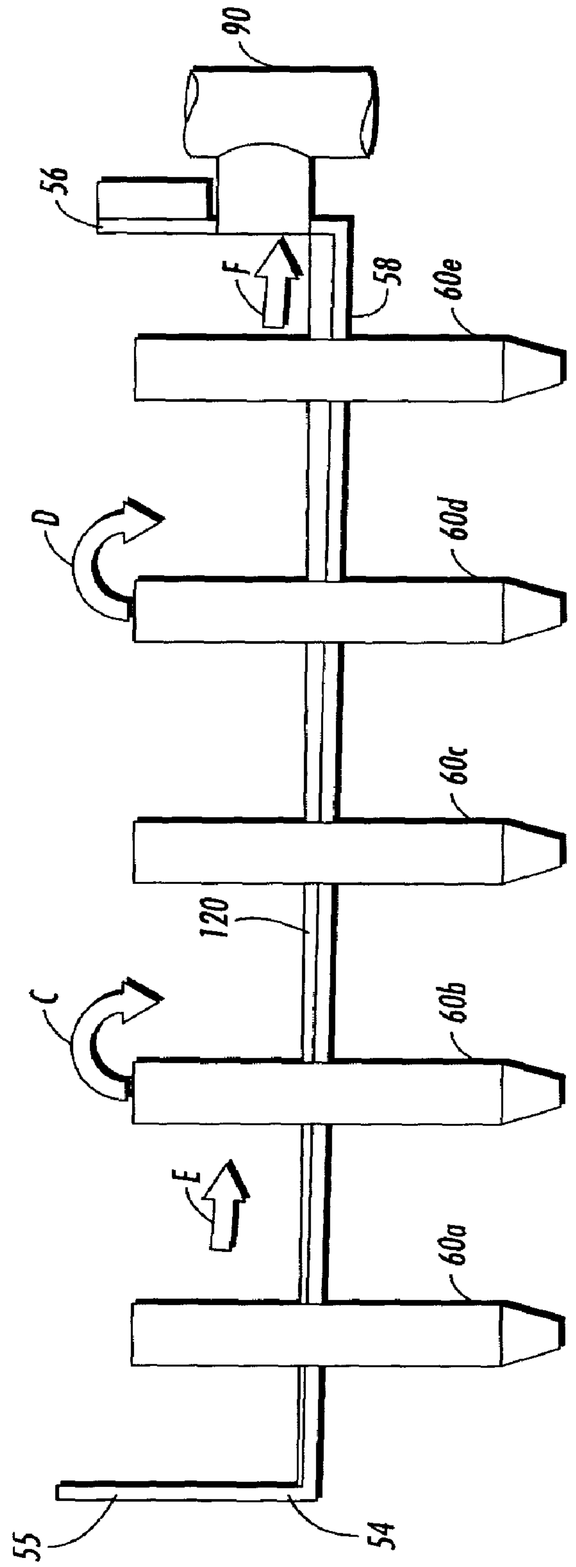
FIG. 2 is a schematic illustration of a known venting configuration such as may be used in the dip coating apparatus of FIG. 1.

FIG. 2 schematically illustrates a conventional venting configuration. As shown in FIG. 2, the tank 54 includes two ends, a distal end 55 and a venting end 56. A tank bottom wall 58 extends between the ends 55 and 56. In the embodiment shown in FIG. 2, the bottom wall is pitched at an angle to enhance flow of the dip coating liquid to one end of the tank. Optionally, the tank bottom wall can also be level. As will be appreciated, the venting end 56 is located at the end of the tank at which the dip coating liquid 120 is drawn to the liquid return line 90. It is at this end of the tank, i.e. end 56, that venting is traditionally performed.

FIG. 2 also illustrates a plurality of dip tubes 60*a*, 60*b*, 60*c*, 60*d*, and 60*e*. A current dip process relies on two vents to remove the solvent vapors from the coating area, i.e. generally the interior of the tank 54. Arrows C, D, E, and F illustrate exemplary vapor flows across the tank and specifically, above the surface of the dip coating liquid 120, during venting.

This process utilizing the conventional venting configuration illustrated in FIG. 2 using laterally positioned vents at an end of the tank works very well but there exists uniformity differences across the batch of drums. This non-uniformity is caused by the large volumes of solvent vapor being drawn out of the vents that are typically located next to each other and generally within the same region as the liquid return line 90. There also exists the associated problem of the dip coating liquid 120 that is being returned to the pump room 100 through the liquid return line 90. This line 90 is thus also venting solvent vapors from the dip tank 54, and often back to the dip tubes 60. This promotes over-saturation of the vapor bath on the vent side of the dip tank assembly.

The level of the dip coating liquid 120 is shown in FIG. 2. A mentioned, the tank bottom wall 58 may be optionally sloped to promote flow of the dip coating liquid to one end of the tank 54. The liquid 120 can in the exemplary embodiment shown, accumulate in the tank 54 until its level exceeds a threshold value set by a weir, opening or drain, at the end of the tank at which is located the liquid return line 90.

Figure 3:
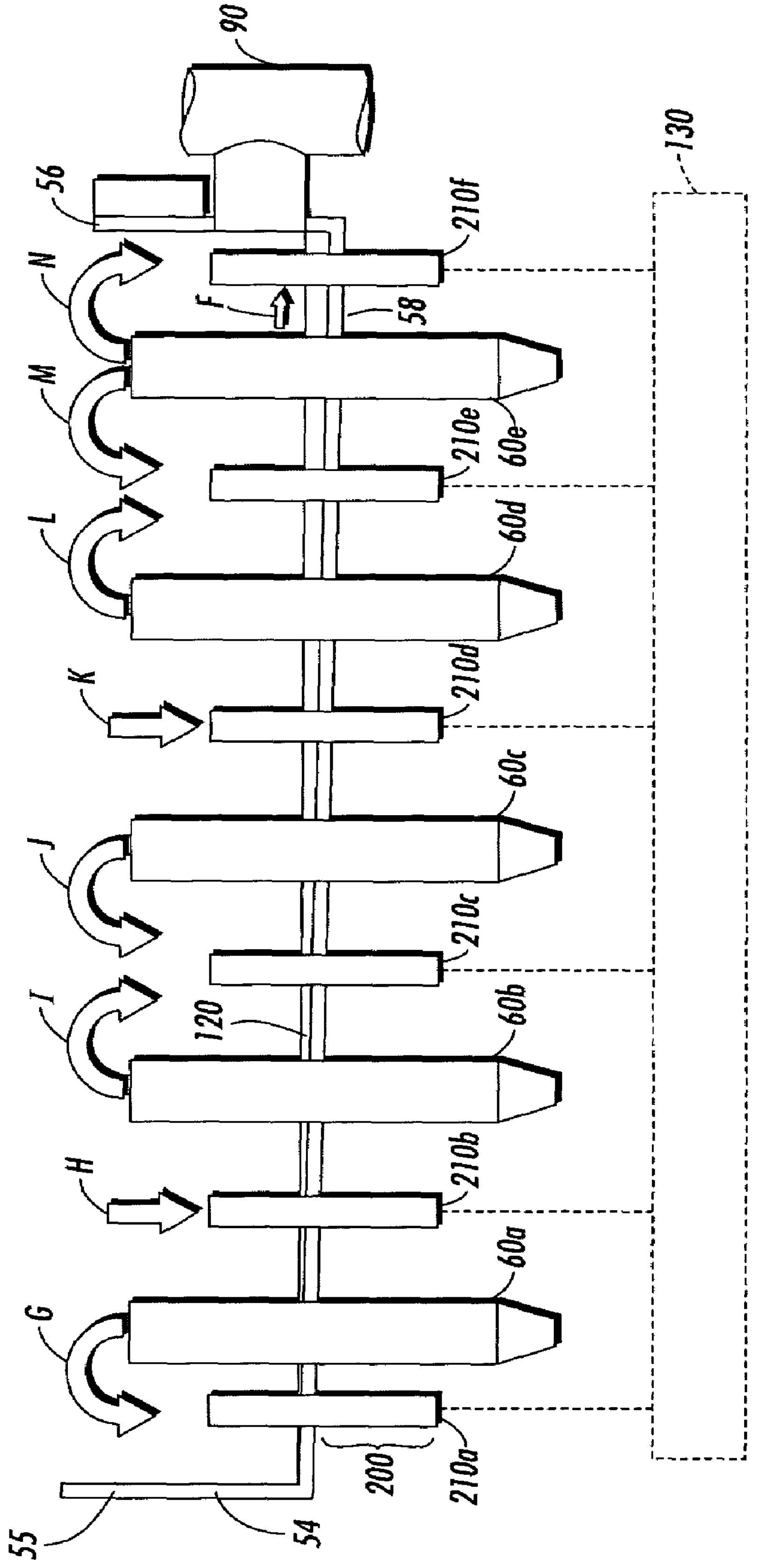
FIG. 3 is a schematic illustration of an exemplary embodiment venting assembly according to the present discovery.

FIG. 3 schematically illustrates a venting assembly according to the exemplary embodiment of this disclosure. FIG. 3 illustrates the tank 54 including an exemplary embodiment venting assembly. The venting assembly includes a vent tube collection 200 including a plurality of vertical vent tubes 210. For example, vent tubes 210*a*, 210*b*, 210*c*, 210*d*, 210*e*, and 210*f* are illustrated. It will be noted that each of these tubes is disposed between or alongside a corresponding vertical dip tube 60 such as dip tubes 60*a*, 60*b*, 60*c*, 60*d*, and 60*e*. Each of the vent tubes 210 extends across or over the depth of the dip coating liquid 120 contained in the tank 54 and further extends below the bottom wall 58 of the tank 54. Preferably, the vent tubes 210 extend from about 5 mm to about 200 mm above the dip coating liquid 120. If this height is less than 2 mm, there is a high probability of solution flowing into the vent tubes, which is undesirable. If this height is greater than 10 mm above the dip tube, the solvent vapor zone may be too small or large to produce uniform coating.

Venting is performed such that vapors within the tank 54 and typically above the surface of the dip coating liquid 120, are drawn through each of the vent tubes 210 shown for example by arrows G, H, I, J, K, L, M, and N. The vapors are drawn downward through each of the vent tubes 210 to a venting manifold 130 for subsequent removal, processing, or recovery.

FIG. 3 also illustrates that conventional venting may be performed in conjunction with the venting assembly of the exemplary embodiment. Accordingly, vent fumes may also flow such as shown by arrow F in the direction of the return line 90.

This strategy depicted in FIG. 3 uses one or more vent tubes 210 around each dip tube 60. Each vent 210 can for example, be in the form of a tube or pipe with an inside diameter of about 1.25 inches to about 0.25 inches. However, the present discovery includes the use of vents having an inside diameter greater than or less than these sizes. In addition, the present discovery encompasses the use of vents having non-circular cross sections. The exemplary embodiment uses a vent tube with an inside diameter of 0.75 inch. There can be 30 vent tubes 210 in total per tank. The present discovery however includes a total number of vents per tank or container that is greater than or less than this number. For example, the number of vents may range from about 2 or 3 to about 300. The number of dip tubes can range from about 1 to about 200. The present exemplary embodiment includes a greater number of dip tubes per tank. Restated, an exemplary ratio of the number of vent tubes to dip tubes is about 8:1 to about 1:1, including about 3:2.

Each vent can exit through the bottom wall 58 of the dip tank 54. All vents are in flow communication with one or more venting manifolds. For instance, such flow communication can be provided by a polypropylene tube connected to a vent tube which leads to a venting manifold. The venting manifold in turn, is in flow communication with a pressure differential inducing component such as a vacuum pump. One of the main benefits of this venting system is that it ensures that all dip tubes will have substantially the same amount of vapor being drawn away from each dip tube. The original vents, i.e. the two previously mentioned vents disposed in the venting end 56 of the tank 54, can be retained and used to ensure that the dip coating liquid 120 in the bottom of the tank 54 is vented properly.

Figure 4:
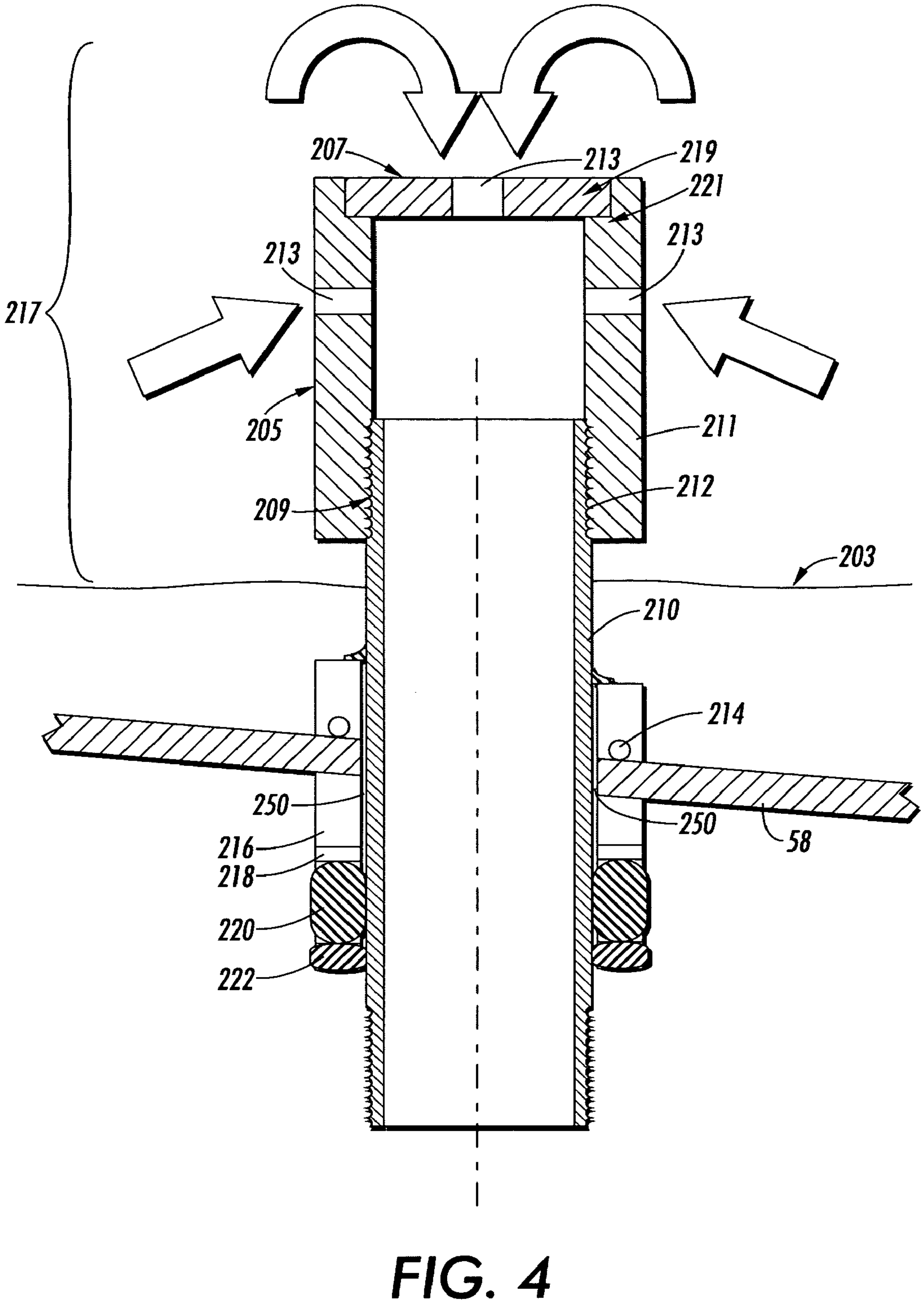
FIG. 4 is a detailed cross-sectional view of a preferred mounting configuration for a vent tube according to the exemplary embodiment.

FIG. 4 is a schematic cross section of an exemplary embodiment vent tube 210 and its engagement with the bottom wall 58 of the tank 54 of the dip coating apparatus. In this exemplary engagement configuration, the vent tube 210 extends through an aperture 250 defined in the bottom wall 58. An upper distal end 212 of the vent tube 210 preferably defines a threaded region 209. One or more sealing rings 214 are preferably used along the outer periphery of the vent tube 210 at the bottom 58 of the tank. One or more sealing elements 216 can be disposed along the underside of the bottom 58 of the tank. In conjunction with the sealing elements 216 it is contemplated to use one or more washers 218 in conjunction with threaded fasteners 220 and retaining elements 222. The sealing ring 214 can be a polytetrafluoroethylene encapsulated VITON™ O-ring. The threaded fastener 220 can be a nut that is threadedly engaged with another region of threads defined along the outer periphery of the vent tube 210. The retaining element 222 can be a locking nut or "jam" nut. Generally, all components are formed from stainless steel unless indicated otherwise. However, other materials such as aluminum, plastic, copper, etc., are also suitable.

Attached, preferably reversibly attached by mating grooves 209, etc., to the upper distal end 212 of the vent tube 210 is a venting orifice 211 having a top wall 207 and a circular side wall 205 with one or more openings 213. The height and diameter of the venting orifice 211 can vary depending upon the circumstances desired. The venting orifice 211 may have any such suitable, cross-sectional shape such as, for example, circular, square, rectangular, and the like. Furthermore, the location, number, arrangement, configuration, etc., of the openings or through holes 213 can vary depending upon the final coating properties desired, etc.

In this regard, the height of the venting orifice 211 is preferably from about 25 mm to about 75 mm above the coating solution level 203, including from about 5 mm to about 150 mm. The number of openings 213 can range from one to about 100, including 1 to 10. A wide range of patterns for the opening are possible, including vertical, horizontal, or angled slits, holes, screens, etc. The diameter of the openings 213 can range from about 2 mm to about 50 mm, including from about 0.5 mm to about 180 mm.

In the embodiment shown in FIG. 4, the top wall 207 of the orifice 211 is a small, penny-sized disc 219 with a through hole 213 in the center. The disc 219 lies in a recess 221 in the top of the vent. This makes it easy to change out the disc 219 for different through hole 213 sizes. The venting tubes and orifices are arranged and configured in a manner to produce a solvent vapor zone 217 above the dip coat liquid 203, which is substantially uniform in vapor concentration.

Figure 5:
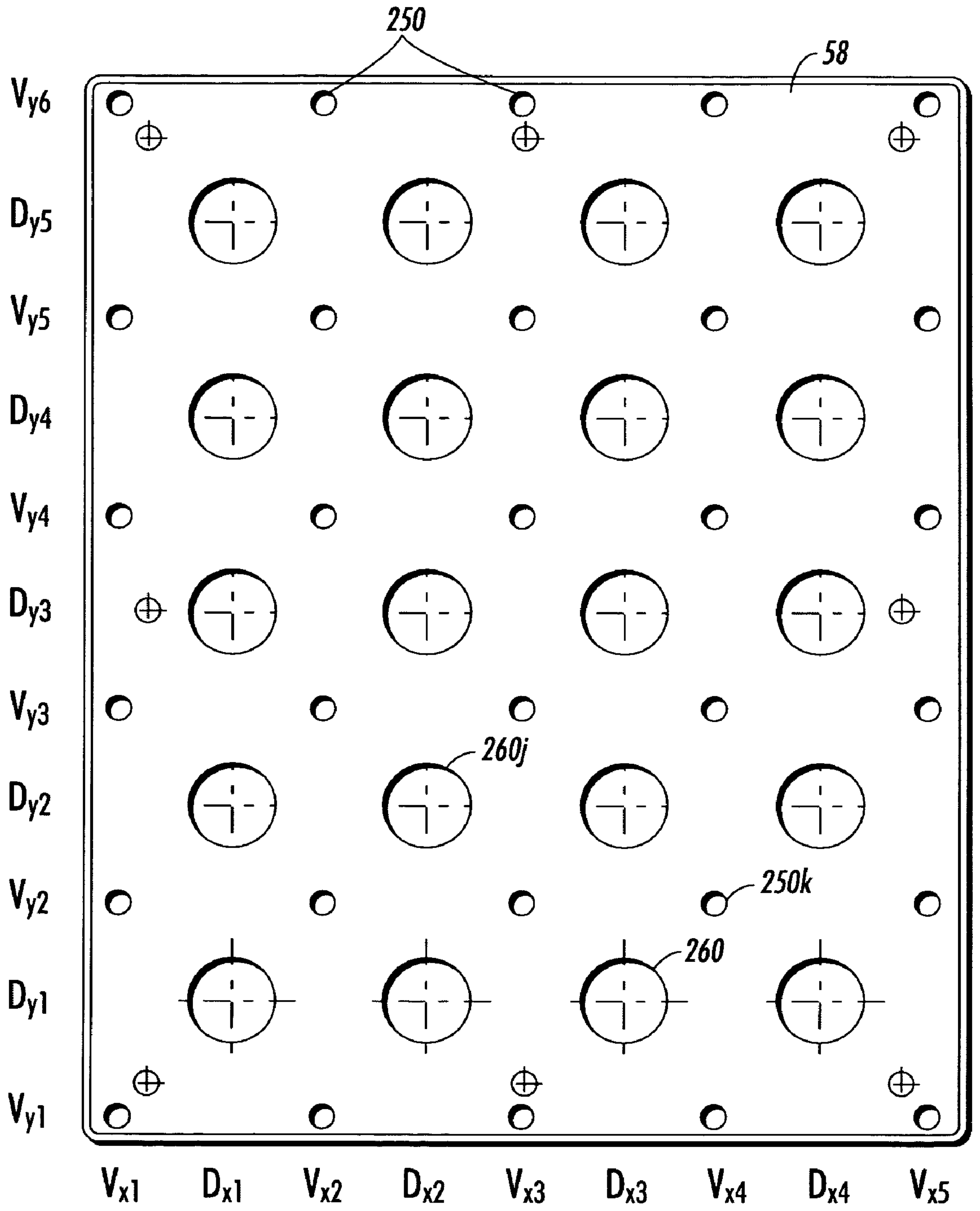
FIG. 5 is a planar view of a bottom wall of a tank for holding a dip coating liquid used in the exemplary embodiment.

FIG. 5 is a plan view of the bottom 58 of the tank 54 for containing the dip coating liquid 120. FIG. 5 illustrates an exemplary configuration for the positioning of the vent tube collection 200 with respect to the dip tubes 60. Specifically, FIG. 5 illustrates a plurality of vent tube apertures 250 arranged across the bottom of the tank, and a plurality of dip tube apertures 260 also arranged across the bottom 58. It will be noted that the vent tube apertures 250 are arranged in rows between the rows of the dip tube apertures 260. Other patterns are also possible as long as substantially the same amount of vapor is being drawn from each dip tube.

In FIG. 5, each row of the dip tube apertures 260 is designated by either $D_x$ or $D_y$. In the exemplary configuration shown in FIG. 5, four vertical rows of dip tube apertures 260 are designated as $D_{x1}$, $D_{x2}$, $D_{x3}$, and $D_{x4}$. And, five horizontal rows of dip tube apertures are designated as $D_{y1}$, $D_{y2}$, $D_{y3}$, $D_{y4}$, and $D_{y5}$. This yields a total of 20 apertures for dip tubes 60. Similarly, five vertical rows of vent tube apertures 250 are designated as $V_{x1}$, $V_{x2}$, $V_{x3}$, $V_{x4}$, and $V_{x5}$. And, six horizontal rows of vent tube apertures 250 are designated as $V_{y1}$, $V_{y2}$, $V_{y3}$, $V_{y4}$, $V_{y5}$ and $V_{y6}$. This yields a total of 30 apertures for vent tubes 210. Thus, each aperture can be identified by referring to its coordinates such as for example dip tube aperture 260*j* can be identified by its coordinates $D_{x2}$, $D_{y2}$. And, the vent tube aperture 250*k* can be identified by its coordinates $V_{x4}$, $V_{y2}$. Accordingly, the exemplary embodiment can utilize a row arrangement of dip tubes and vent tubes across the tank. In certain configurations, at least a portion of the rows of bent tubes are disposed between adjacent rows of the dip tubes. This is shown for example in FIGS. 3 and 5. However, it will be appreciated that in addition to, or instead of, a row arrangement, the plurality of vent tubes can be arranged in nearly any manner such that venting uniformity is achieved or promoted.

Utilizing the venting assembly for the dip coating apparatus disclosed above, dip coated photosensitive members, such as drum photoreceptors, can be produced having layers of improved uniform thickness. The layers can be any layer desired to be applied to the base substrate, including but not limited to, undercoat layers (UCL), charge generating layers (CGL), charge transport layers (CTL), overcoat layers (OCL), etc.

Furthermore, while reference herein is to a cylindrical drum as the component to be dip coated, the disclosure also includes other photoconductors such as those in the form of a continuous belt. In such an embodiment, the belt may be held in a cylindrical shape such as fitted over a cylindrical drum or stretched between rollers to produce a similar shape.

With respect to the substrate, for example, the drum substrate can be formulated entirely of an electrically conductive material, or it can be an insulating material having an electrically conductive surface. The substrate can be opaque or substantially transparent and can comprise numerous suitable materials having the desired mechanical properties. The entire substrate can comprise the same material as that in the electrically conductive surface or the electrically conductive surface can merely be a coating on the substrate. Any suitable electrically conductive material can be employed. Typical electrically conductive materials include metals like copper, brass, nickel, zinc, chromium, stainless steel; and conductive plastics and rubbers, aluminum, semitransparent aluminum, steel, cadmium, titanium, silver, gold, paper rendered conductive by the inclusion of suitable material therein or through conditioning in a humid atmosphere to ensure the presence of sufficient water content to render the material conductive, indium, tin, metal oxides, including tin oxide and indium tin oxide, and the like.

The layers of the substrate member, can vary in thickness over substantially wide ranges depending on the desired use of the photoconductive member. Generally, the conductive layer ranges in thickness of from about 50 Angstroms to 10 centimeters, although the thickness can be outside of this range. If desired, a conductive substrate can be coated onto an insulating material. In addition, the substrate can comprise a metallized plastic, such as titanized or aluminized MYLAR® (available from DuPont). The coated or uncoated substrate can be flexible or rigid, and can have any number of configurations. The substrates preferably have a hollow, cylindrical configuration.

The dip coating solution may comprise materials typically used for any layer of a photosensitive member including such layers as a subbing layer, a charge barrier layer, an adhesive layer, a charge transport layer, and a charge generating layer, such materials and amounts thereof being illustrated for instance in U.S. Pat. No. 4,265,990, U.S. Pat. No. 4,390,611, U.S. Pat. No. 4,551,404, U.S. Pat. No. 4,588,667, U.S. Pat. No. 4,596,754 and U.S. Pat. No. 4,797,337, the disclosures of which are totally incorporated by reference.

In certain embodiments, the coating solution may be formed by dispersing a charge generating material (CGL) selected from azo pigments such as Sudan Red, Dian Blue, Janus Green B, and the like; quinine pigments such as Algol Yellow, Pyrene Quinone, Indanthrene Brilliant Violet RRP, and the like; quinocyanine pigments; perylene pigments; indigo pigments such as indigo, thioindigo, and the like; bisbenzoimidazole pigments such as Indofast Orange toner, and the like; phthalocyanine pigments such as copper phthalocyanine, aluminochlorophthalocyanine, and the like; quinacridone pigments; or azulene compounds in a binder resin such as polyester, polystyrene, polyvinyl butyral, polyvinyl pyrrolidone, methyl cellulose, polyacrylates, cellulose esters, and the like.

The average particle size of the pigment particles is between about 0.05 micrometer and about 0.10 micrometer. Generally, charge generating layer dispersions for immersion coating mixture contain pigment and film forming polymer in the weight ratio of from 20 percent pigment/80 percent polymer to 80 percent pigment/20 percent polymer. The pigment and polymer combination are dispersed in solvent to obtain a solids content of between 3 and 6 weight percent based on total weight of the mixture. However, percentages outside of these ranges may be employed so long as the objectives of the process of this disclosure are satisfied. A representative charge generating layer coating dispersion comprises, for example, about 2 percent by weight hydroxy gallium phthalocyanine; about 1 percent by weight of terpolymer of vinyl acetate, vinyl chloride, and maleic acid (or a terpolymer of vinylacetate, vinylalcohol and hydroxyethylacrylate); and about 97 percent by weight cyclohexanone.

In other embodiments, the coating solution may be formed by dissolving a charge transport material (CTL) selected from compounds having in the main chain or the side chain a polycyclic aromatic ring such as anthracene, pyrene, phenanthrene, coronene, and the like, or a nitrogen-containing hetero ring such as indole, carbazole, oxazole, isoxazole, thiazole, imidazole, pyrazole, oxadiazole, pyrazoline, thiadiazole, triazole, and the like, and hydrazone compounds in a resin having a film-forming property. Such resins may include polycarbonate, polymethacrylates, polyacrylate, polystyrene, polyester, polysulfones, styrene-acrulonitrile copolymer, styrene-methyl methacrylate copolymer, and the like.

An illustrative charge transport layer coating solution contains, for example, about 10 percent by weight N,N'-diphenyl-N,N'-bis(3-methylphenyl)-[1,1'-biphenyl]-4,4'diamine; about 14 percent by weight poly(4,4'-diphenyl-1,1'-cyclohexane carbonate) (400 molecular weight); about 57 percent by weight tetrahydrofuran; and about 19 percent by weight monochlorobenzene.

The present disclosure also encompasses the use of one, two, or more additional tanks, along with their corresponding solvent vapor venting assemblies to hold different coating solutions, whereby the various layers of a photosensitive member can be formed in succession on a batch of substrate members. Furthermore, before and/or after producing a layer by dip coating, other layers may also be applied by further coating processes.

Various factors affect the thickness of the deposited layer produced by dip coating. These factors include, for example, the solids loading of the total liquid coating materials, the viscosity of the liquid coating material, and the relative velocity of the liquid coating material in the space between the drum surface and coating vessel wall. Additionally, the thickness of the deposited coating varies with the specific solvent, film forming polymer and pigment materials utilized for any given coating composition. For thin coatings, a relatively slow drum withdrawal (pull) rate is desirable when utilizing high viscosity liquid coating materials. Generally, the viscosity of the liquid coating material varies with the solids content of the liquid coating materials. Satisfactory results may be achieved with viscosities between about 1 centipoise and about 100 centipoises. Preferably, the viscosity is between 2 centipoises and about 10 centipoises.

Utilizing the venting assembly and process disclosed herein, cylindrical base members having very thin and uniform layers can be produced. For example, optimal undercoat layers of greater than 0 μm (microns or micrometers) to about 100 μm, including from about 1 μm to about 26 μm can be produced. Moreover, charge generating layers (CGL) having thicknesses of from about 0.05 μm to about 100 μm, including from about 0.10 μm to about 5.0 μm and, in some embodiments, from about 0.3 μm to about 3 μm, and/or charge transport layers (CTL) having a thickness of from about 5 μm to about 500 μm, including from about 10 μm to about 50 μm can also be generated. Optional additional undercoat, conductor, adhesive, etc., layers can be similarly produced.

Furthermore, the charge generating layer, charge transport layer, and/or other layers may be applied in any suitable order to produce either positive or negative photoreceptors.

The venting assembly and apparatus disclosed herein produces drum photoreceptors having enhanced uniformity. For example, two 30 mm dip tanks in a conventional dip coating system were modified according to the exemplary embodiment. Because of space constraints under each dip tank, it was not possible to incorporate a separate venting manifold. Instead the vent tubes were left open under the dip tank and caps with adjustable diameter vent holes, i.e. flow control elements, were positioned over the vent tubes. The adjustable diameter vent holes enable a means to adjust vapor flow by tank position, i.e. drum position within the tank. Initial test results demonstrated enhanced results, even without optimizing vent hole diameters. Initial tests kept all vent hole diameters the same. The measured coating thickness data from these tests show an improvement in coating uniformity over the typical run data with the "old" standard dip tanks.

Figure 6:
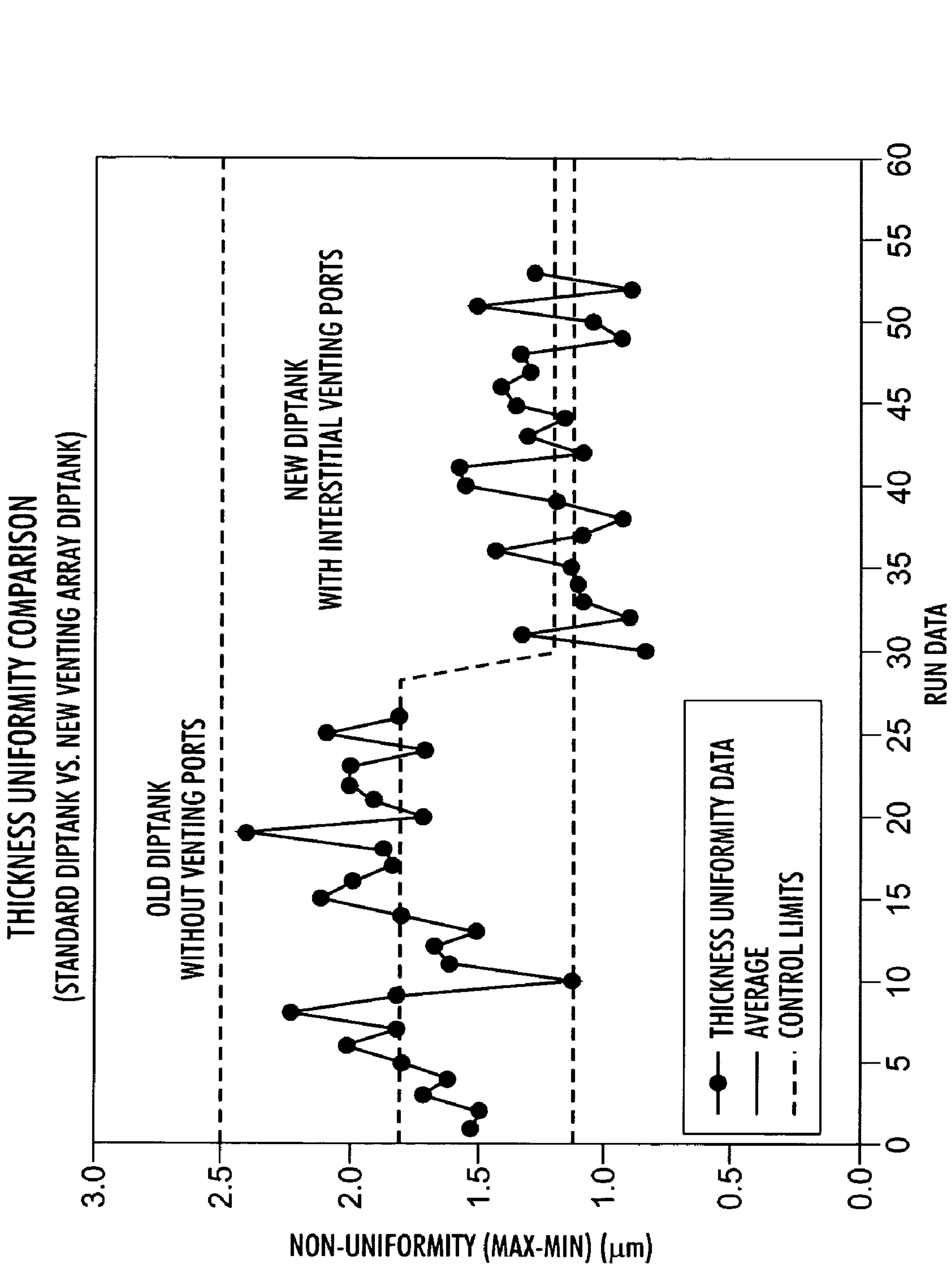
FIG. 6 is a comparison of thickness uniformity in which the non-uniformity of drums produced in a known dip coating apparatus is compared to the non-uniformity of drums produced in a dip coating apparatus using the present exemplary embodiment venting assembly.
Figure 7:
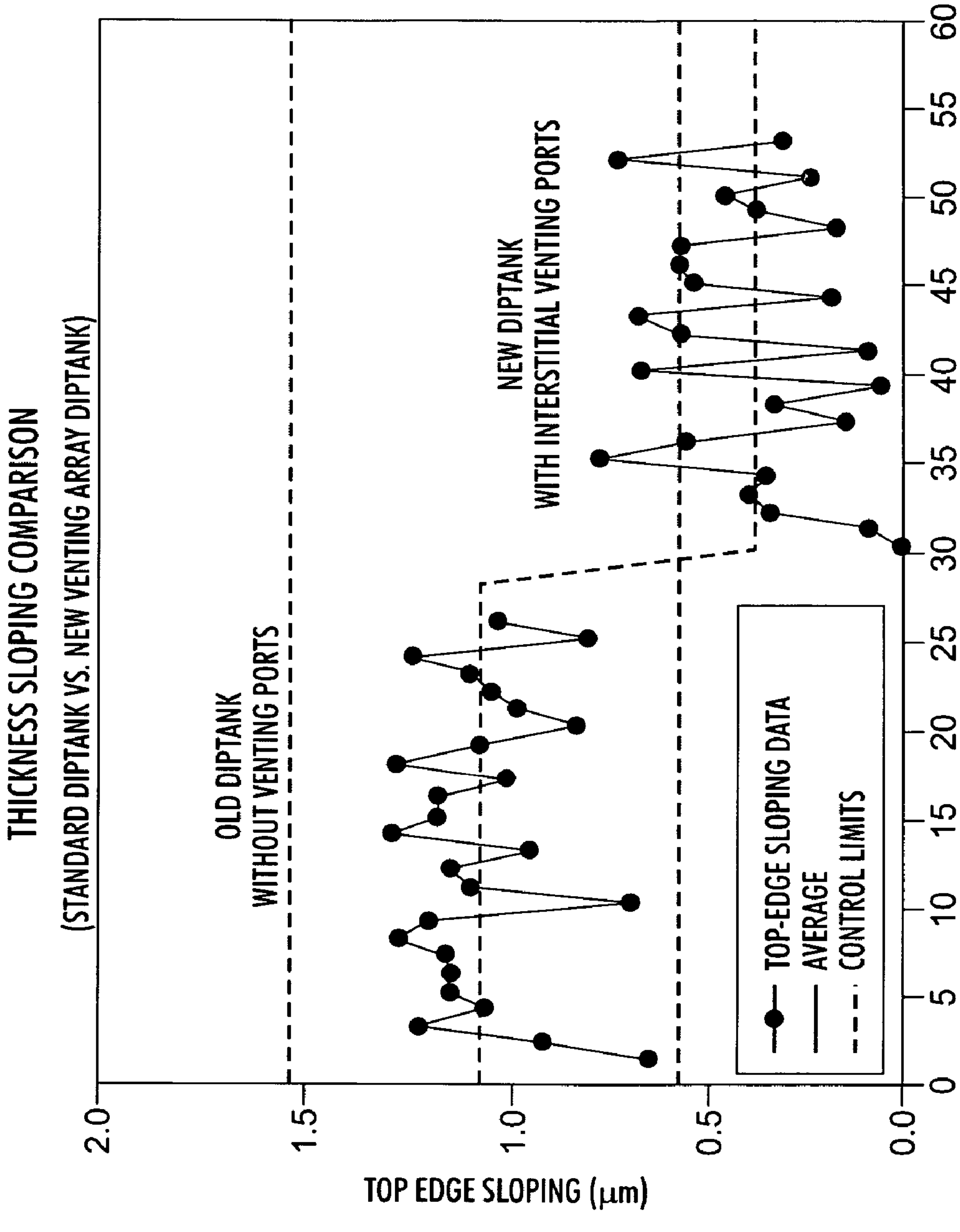
FIG. 7 is a comparison of thickness sloping in which the top edge sloping dimension of drums produced in a known dip coating apparatus is compared with the top edge sloping of drums produced in a dip coating apparatus using the exemplary embodiment venting assembly.

In addition, the "new" dip tank venting modifications improve the top edge sloping of the coating on the drums. As will be appreciated by those skilled in the art, top edge sloping refers to a region at an end of the drum at which the coating or layer varies as compared to other regions of the drum, such as in the middle of the drum. The improvements were significant in that the coating height was reduced without any negative impact on thickness uniformity. The graphs of FIGS. 6 and 7 illustrate coating thickness non-uniformity data as a function of batch and time, as well as top edge sloping data. The shift down in coating thickness non-uniformity and sloping occurs when the dip tanks were changed to the "new" dip tanks with the exemplary embodiment venting. The desired coating thickness on-uniformity specification for many photoreceptors is 2 microns (μm). All photoreceptors produced using the exemplary embodiment dip tanks met this specification. They were also produced with a reduced coating height, which would typically reduce uniformity.

The photoreceptors produced by the present disclosure can be utilized in an electrophotographic imaging process by, for example, first uniformly electrostatically charging the photoreceptor, then exposing the charged photoreceptor to a pattern of activating electromagnetic radiation such as light, which selectively dissipates the charge in the illuminated areas of the photoreceptor while leaving behind an electrostatic image in the non-illuminated areas. This electrostatic latent image may then be developed at one or more developing stations to form a visible image by depositing finely divided electroscopic toner particles, for examples, from a developer composition, on the surface of the photoreceptor. The resulting visible toner image can be transferred to a suitable receiving member, such as paper. The photoreceptor is then typically cleaned at a cleaning station prior to being recharged for formation of subsequent images.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

The invention claimed is:

1. A process for reducing the frequency of defects of dip coated drum photoreceptors, the process performed using a dip coating apparatus including (i) a tank for holding a dip coating liquid, (ii) a plurality of dip tubes vertically arranged within the tank, and (iii) a plurality of vent tubes vertically arranged within the tank to uniformly surround each dip tube, wherein the plurality of vertical vent tubes extend through the depth of the dip coating liguid and through a bottom wall of the tank, and wherein each vent tube has a vapor withdrawing end located above the surface of the dip coating liquid and an end in communication with a venting manifold, the process comprising:

providing a dip coating liquid to the tank;

dip coating a plurality of drums by inserting each drum within a corresponding dip tube and thereby contacting the outer circumferential surface of the drum with the dip coating liquid;

removing the drums from the dip coating liquid to produce a uniform coat on the drum's exterior surface; and removing, in a relatively uniform fashion, vapors residing above a surface of the dip coating liquid in the tank by withdrawing the vapors through the plurality of vent tubes, whereby such uniform removal of vapors promotes uniform drying of the coated drums and reduction in the frequency of defects.

2. The process of claim 1 wherein at least 3 vent tubes surround each dip tube.

3. The process of claim 1 wherein each vent tube contains a flow governing element.

4. The process of claim 3 wherein the flow governing element is a valve.

5. The process of claim 1 wherein the tank comprises a sloped bottom wall.

6. The process of claim 1 wherein the vapor withdrawing end of each vent tube is located from about 5 to about 200 mm above the surface of the dip coating liquid.

7. The process of claim 1 wherein the vapor withdrawing end of each vent tube comprises a venting orifice located from about 25 to about 75 mm above the surface of the dip coating liquid.

8. The process of claim 7 wherein the venting orifice comprises from 1 to about 100 openings.

9. The process of claim 1 wherein the vapor withdrawing end of each vent tube is circular with an inside diameter of from about 0.25 to about 1.25 inches.

10. The process of claim 1 wherein the ratio of vent tubes to dip tubes is from about 8:1 to about 1:1.

11. A process for reducing the frequency of defects of dip coated drum photoreceptors, the process performed using a dip coating apparatus including (i) a tank for holding a dip coating liquid, (ii) a plurality of dip tubes vertically arranged within the tank, and (iii) a plurality of vent tubes vertically arranged within the tank to uniformly surround each dip tube, wherein each vent tube has a vapor withdrawing end located above the surface of the dip coating liquid and an end in communication with a venting manifold, and wherein each dip tube extends vertically above the vent tubes, the process comprising:

providing a dip coating liquid to the tank;

dip coating a plurality of drums by inserting each drum within a corresponding dip tube and thereby contacting the outer circumferential surface of the drum with the dip coating liquid;

removing the drums from the dip coating liquid to produce a uniform coat on the drum's exterior surface; and removing, in a relatively uniform fashion, vapors residing above a surface of the dip coating liquid in the tank through the plurality of vent tubes, whereby such uniform removal of vapors promotes uniform drying of the coated drums and reduction in the frequency of defects.

12. A process for reducing the frequency of defects of dip coated drum photoreceptors, the process performed using a dip coating apparatus including (i) a tank for holding a dip coating liquid, (ii) a plurality of dip tubes vertically arranged within the tank, and (iii) a plurality of vent tubes vertically arranged within the tank to uniformly surround each dip tube, wherein each vent tube has a vapor withdrawing end located above the surface of the dip coating liquid and an end in communication with a venting manifold, wherein each vent tube extends vertically from a bottom wall of the tank to a maximum of 10 mm above the dip tubes, the process comprising:

providing a dip coating liquid to the tank;

dip coating a plurality of drums by inserting each drum within a corresponding dip tube and thereby contacting the outer circumferential surface of the drum with the dip coating liquid;

removing the drums from the dip coating liquid to produce a uniform coat on the drum's exterior surface; and removing, in a relatively uniform fashion, vapors residing above a surface of the dip coating liquid in the tank through the plurality of vent tubes, whereby such uniform removal of vapors promotes uniform drying of the coated drums and reduction in the frequency of defects.

* * * * *